US011293564B2

(12) United States Patent
Hoskins et al.

(10) Patent No.: US 11,293,564 B2
(45) Date of Patent: Apr. 5, 2022

(54) VALVE SILENCING CHOKE

(71) Applicant: Automatic Switch Company, Florham Park, NJ (US)

(72) Inventors: Matthew Tyler Hoskins, Ann Arbor, MI (US); Alexander R. Determan, Davidburg, MI (US)

(73) Assignee: AUTOMATIC SWITCH COMPANY, Florham Park, NJ (US)

( * ) Notice: Subject to any disclaimer, the term of this patent is extended or adjusted under 35 U.S.C. 154(b) by 0 days.

(21) Appl. No.: 16/894,755

(22) Filed: Jun. 5, 2020

(65) Prior Publication Data
US 2021/0381623 A1    Dec. 9, 2021

(51) Int. Cl.
*F16K 11/24*     (2006.01)
*F16K 47/02*     (2006.01)
*F16K 11/044*    (2006.01)
*F16K 47/16*     (2006.01)
*F16K 11/22*     (2006.01)

(52) U.S. Cl.
CPC .......... *F16K 47/023* (2013.01); *F16K 11/044* (2013.01); *F16K 11/22* (2013.01); *F16K 47/16* (2013.01)

(58) Field of Classification Search
CPC ...... F16K 47/023; F16K 47/16; F16K 11/044; F16K 11/22
USPC ...... 137/625.48, 115.08, 115.09, 115.1, 491, 137/489, 625.25, 625.2, 625.69, 596.16, 137/487.5, 627.5, 565.19, 625.11; 251/129.15; 91/45, 443, 450; 60/545
See application file for complete search history.

(56) References Cited

U.S. PATENT DOCUMENTS

| 3,329,165 | A | * | 7/1967 | Lang ................... F15B 13/0405 |
| | | | | 137/625.5 |
| 3,424,951 | A | | 1/1969 | Barker |
| 3,446,473 | A | | 5/1969 | Barker |
| 3,523,676 | A | | 8/1970 | Barker |
| 4,074,700 | A | * | 2/1978 | Engle .................. F16K 31/0627 |
| | | | | 137/625.27 |

(Continued)

FOREIGN PATENT DOCUMENTS

| CN | 101038042 A | 9/2007 |
| CN | 204996246 U | 1/2016 |

(Continued)

OTHER PUBLICATIONS

Cunningham, et al, A High Pressure Shut-Off Valve for a Hydraulic Hybrid Accumulator, Final Report; Mechanical Engineering 450, Section 3, accessed: Nov. 2019.

(Continued)

*Primary Examiner* — Minh Q Le
(74) *Attorney, Agent, or Firm* — Mackey Law Firm PLLC (57) ABSTRACT

A silencing choke for a solenoid valve can include a base and a stem configured to be coupled to an armature and can be configured for at least partially reducing or eliminating noise caused by armature bounce. A choke can be configured for limiting maximum flow through an orifice during at least a portion of a valve transition, which can include creating a state of orifice limited flow during the occurrence of armature bounce. A choke can be configured for at least partially reducing cross flow among ports and for limiting a maximum flow rate through at least one flow path of a valve.

20 Claims, 5 Drawing Sheets

(56) References Cited

U.S. PATENT DOCUMENTS

| | | | |
|---|---|---|---|
| 4,442,998 A | | 4/1984 | Ohyama et al. |
| 4,641,686 A | | 2/1987 | Thompson |
| 4,741,364 A | * | 5/1988 | Stoss .................. F15B 13/0402 |
| | | | 137/625.64 |
| 4,872,638 A | * | 10/1989 | Thompson .......... F16K 31/1262 |
| | | | 251/54 |
| 4,878,650 A | | 11/1989 | Daly et al. |
| 5,139,224 A | | 8/1992 | Bright |
| 5,299,776 A | | 4/1994 | Brinn, Jr. et al. |
| 5,549,136 A | * | 8/1996 | Drocco .................. B01F 13/10 |
| | | | 137/871 |
| 6,109,541 A | | 8/2000 | Beatty et al. |
| 7,987,871 B2 | * | 8/2011 | Cho .................. F16K 31/0627 |
| | | | 137/625.65 |
| 8,001,952 B2 | | 8/2011 | Dohrmann et al. |
| 8,689,772 B2 | | 4/2014 | Hefler et al. |
| 8,783,653 B2 | * | 7/2014 | Jamison .............. F16K 31/0658 |
| | | | 251/129.18 |
| 9,139,184 B2 | | 9/2015 | Lee |
| 10,316,785 B2 | | 6/2019 | Lee et al. |
| 2006/0065315 A1 | * | 3/2006 | Neff .................... F16K 27/0263 |
| | | | 137/625.65 |
| 2008/0251748 A1 | * | 10/2008 | Neff .......................... F17D 5/00 |
| | | | 251/129.15 |
| 2009/0102082 A1 | | 4/2009 | Gattolliat et al. |
| 2012/0061600 A1 | * | 3/2012 | Neff ...................... F16K 11/044 |
| | | | 251/129.15 |
| 2012/0318242 A1 | | 12/2012 | Roh et al. |
| 2014/0021384 A1 | * | 1/2014 | Kabel .................. F16K 11/044 |
| | | | 251/129.01 |
| 2014/0175312 A1 | * | 6/2014 | Jamison ................ F16K 27/029 |
| | | | 251/129.15 |
| 2015/0096630 A1 | * | 4/2015 | Ogawa .................. F16K 11/044 |
| | | | 137/487.5 |
| 2016/0230678 A1 | * | 8/2016 | Layne ................ F02D 13/0203 |
| 2018/0112798 A1 | * | 4/2018 | Junk .................. F16K 37/0091 |
| 2019/0055673 A1 | * | 2/2019 | Dellen .................... B65H 54/70 |
| 2019/0136876 A1 | | 5/2019 | Fallahi |

FOREIGN PATENT DOCUMENTS

| | | |
|---|---|---|
| CN | 108374911 A | 8/2018 |
| DE | 2405852 A1 | 8/1975 |
| DE | 3637409 A1 | 5/1988 |
| EP | 0636209 B1 | 5/1998 |
| GB | 17089 A | 7/1909 |
| JP | 1162761 A | 3/1999 |
| JP | 2002139266 A | 5/2002 |
| JP | 2011033088 A | 2/2011 |
| KR | 101171995 B1 | 8/2012 |
| KR | 101603656 B1 | 3/2016 |
| WO | 2018142368 A1 | 8/2018 |
| WO | 2019014396 A1 | 1/2019 |

OTHER PUBLICATIONS

FAMESON & IDQUO, How to Preent Solenoid Valve Noises, Tameson, accessed: Nov. 2019.

PCT Application No. PCT/US2021/035975—International Search Report and Written Opinion dated Sep. 21, 2021.

* cited by examiner

VALVE SILENCING CHOKE

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO APPENDIX

Not applicable.

BACKGROUND OF THE INVENTION

Field of the Invention

The present disclosure relates generally to valves and more specifically relates to silencing chokes for solenoid valves.

Description of the Related Art

Flow control systems are common in process and manufacturing systems, such as in sterile, aseptic, medical, physiological and food applications, among others. It can be important to accurately control various parameters in such systems, including flow rates, valve positions, pressure, valve health and other aspects of fluid control components. Accordingly, fluid control systems and valves that provide rapid and accurate control of fluid flow are called for in numerous industries. Further, some industries and applications call for fluid control systems and valves that incorporate features relating to noise reduction, such as in applications wherein valves are utilized in close proximity to people.

Armature bounce in solenoid actuated valves, or solenoid valves, can result in rapid flow and pressure fluctuations. For example, during the energized to deenergized transition, bouncing of the armature and hence the poppet can occur and variations in stroke caused by the bouncing can cause variations in flow and pressure. Such variations in stroke can result in effective orifice area changes in stroke limited states and in at least some cases can cause rapid flow and pressure fluctuations that occur at an audible frequency and which thus can be perceived as noise.

Accordingly, there is a need in the art for improved solenoid valves having features for minimizing armature bounce and achieving quieter operation, including during energized to deenergized transitions. Additionally, there is a need in the art for improved solenoid valves having features for mitigating cross flow from one port to another during such a transition and for restricting flow for backwards compatibility in the intended use of the valve. The disclosures and teachings of the present disclosure are directed to devices, systems and methods for improved solenoid valves.

BRIEF SUMMARY OF THE INVENTION

In at least one embodiment, a solenoid valve can include a pressure port, a common port, an exhaust port and an armature with a poppet having a first side for selectively engaging a first orifice fluidically between the pressure port and the common port and a second side for selectively engaging a second orifice fluidically between the common port and the exhaust port, and a silencing choke. The silencing choke can include a base having a first side and a longitudinally opposite second side, a stem coupled to the second side of the base, and an opening through the base and the stem. The silencing choke can be configured to be coupled to the armature with the armature disposed through the opening and the first side of the base facing the second side of the poppet.

In at least one embodiment, the solenoid valve can have an energized state wherein the poppet sealingly engages the first orifice, a deenergized state wherein the poppet sealingly engages the second orifice and a transitional state wherein the valve is transitioning from the energized state to the deenergized state. The silencing choke can be configured so that at least a portion of the silencing choke is disposed through the second orifice when the solenoid valve is in at least one of the energized state, the deenergized state and the transitional state. The silencing choke can be configured so that at least a portion of the silencing choke is disposed through the second orifice when the solenoid valve is in each of the energized state, the deenergized state and the transitional state. The silencing choke can be configured so that the base is disposed within the common port when the solenoid valve is in the energized state.

In at least one embodiment, the silencing choke can be configured to limit maximum flow through the second orifice during at least a portion of the transitional state. The silencing choke can be configured to limit maximum flow through the second orifice during the portion of the transitional state wherein armature stroke variations result in flow variations. The silencing choke can be configured to at least partially reduce noise caused by bouncing of the armature and/or poppet during deenergization of the solenoid valve.

In at least one embodiment, the base of the choke can have a major dimension that is less than a major dimension of the second orifice. In at least one embodiment, the stem of the choke can have a major dimension that is less than the major dimension of the base. In at least one embodiment, the stem of the choke can include one or more spokes configured to bias the base toward a central position relative to the second orifice for preventing the base from contacting a seat of the second orifice. In at least one embodiment, the stem of the choke can include a plurality of spokes that extend radially outwardly from an exterior surface of the stem and the plurality of spokes and the exterior surface of the stem can define at least one vent pathway for routing fluid from the common port to the exhaust port when the solenoid valve is in an energized state. In at least one embodiment, the silencing choke can be configured to be coupled to the armature by interference fit.

DETAILED DESCRIPTION

The Figures described above and the written description of specific structures and functions below are not presented to limit the scope of what Applicants have invented or the scope of the appended claims. Rather, the Figures and written description are provided to teach any person skilled in the art to make and use the invention(s) for which patent protection is sought. Those skilled in the art will appreciate that not all features of a commercial embodiment of the disclosure are described or shown for the sake of clarity and understanding. Persons of skill in this art will also appreciate that the development of an actual commercial embodiment incorporating aspects of the present disclosure can require numerous implementation-specific decisions to achieve the developer's ultimate goal for the commercial embodiment(s). Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in the art having the benefits of this disclosure. It must be understood that the embodiment(s) disclosed and taught herein are susceptible to numerous and various modifications and alternative forms. The use of a singular term, such as, but not limited to, "a," is not intended as limiting of the number of items. The use of relational terms, such as, but not limited to, "top," "bottom," "left," "right," "upper," "lower," "down," "up," "side," "first," "second," ("third" et seq.), "inlet," "outlet" and the like are used in the written description for clarity in specific reference to the Figures and are not intended to limit the scope of the disclosure or the appended claims unless otherwise indicated. The terms "couple," "coupled," "coupling," "coupler," and like terms are used broadly herein and can include any method or device for securing, binding, bonding, fastening, attaching, joining, inserting therein, forming thereon or therein, communicating, or otherwise associating, for example, mechanically, magnetically, electrically, chemically, operably, directly or indirectly with intermediate elements, one or more pieces of members together and can further include without limitation integrally forming one member with another in a unity fashion. The coupling can occur in any direction, including rotationally. The terms "include" and "such as" are illustrative and not limitative, and the word "can" means "can, but need not" unless otherwise indicated. Notwithstanding any other language in the present disclosure, the embodiment(s) shown in the drawings are examples presented for purposes of illustration and explanation and are not the only embodiments of the subject(s) hereof.

Applicants have created devices, systems and methods for improved solenoid valves and solenoid valve operation. Applicants have created devices, systems and methods for at least partially minimizing armature bounce in solenoid valves and for achieving quieter operation of solenoid valves, including during energized to deenergized transitions. Applicants have created devices, systems and methods for reducing the effective flow area of a solenoid valve during at least a portion of a transition state to at least partially minimize or eliminate noise from bouncing of the valve's armature. Applicants have created devices, systems and methods for at least partially minimizing or eliminating audible sound caused by flow fluctuations during stroke limited operation of solenoid valves, including but not limited to micro solenoid valves. Applicants have created devices, systems and methods for mitigating cross flow among ports of solenoid valves and for relatively easily restricting flow for backwards compatibility implementations. One or more aspects and embodiments of the disclosure will be described in further detail below with reference to the Figures.

Figure 1:
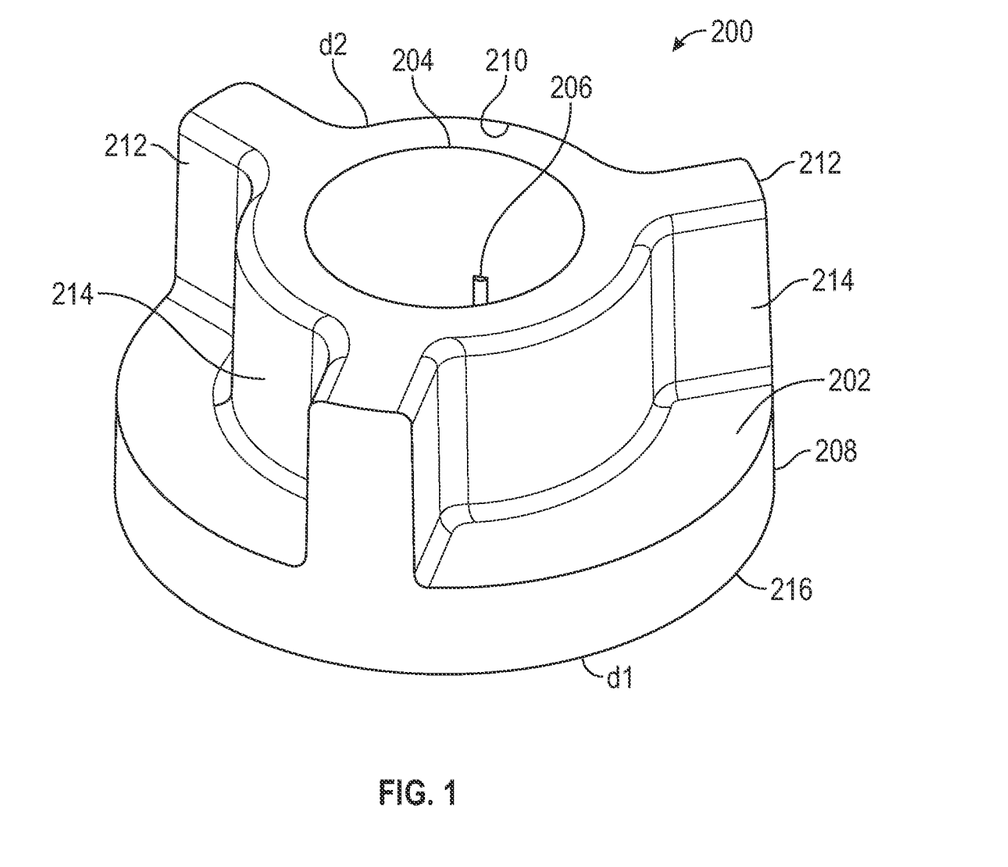
FIG. 1 is a perspective view of one of many embodiments of a silencing choke according to the disclosure.
Figure 2:
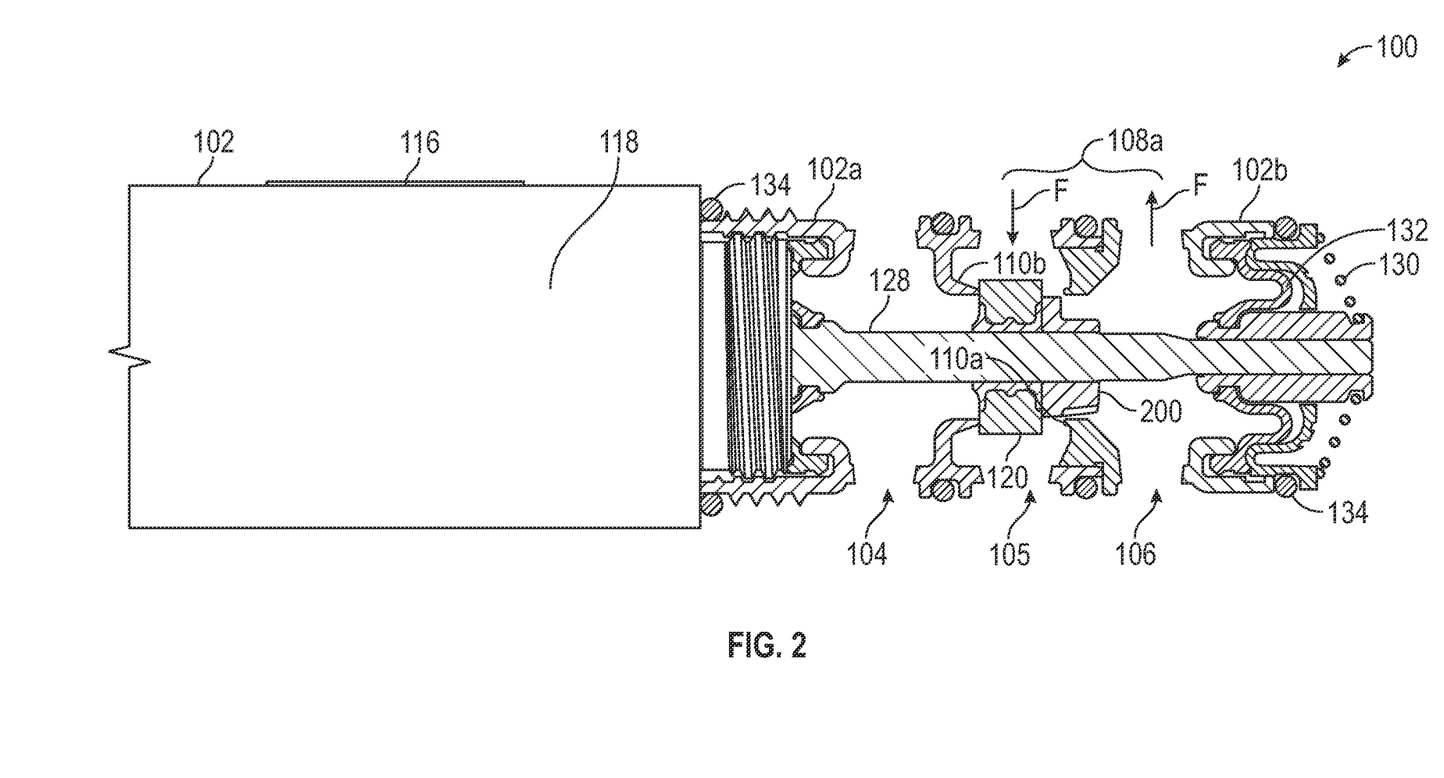
FIG. 2 is a schematic partial cross-sectional view of one of many embodiments of a solenoid valve in an energized state and having a silencing choke according to the disclosure.
Figure 3:
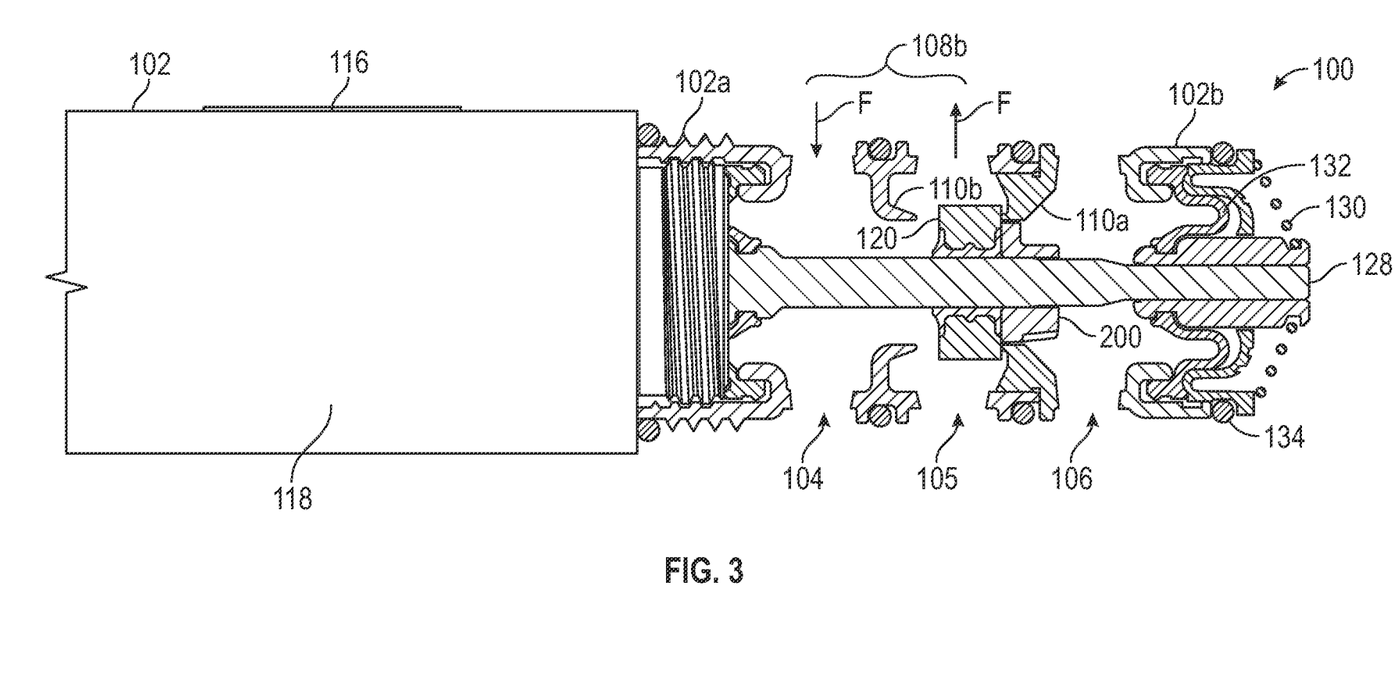
FIG. 3 is a schematic partial cross-sectional view of the embodiment of FIG. 2 in a de-energized state.
Figure 4:
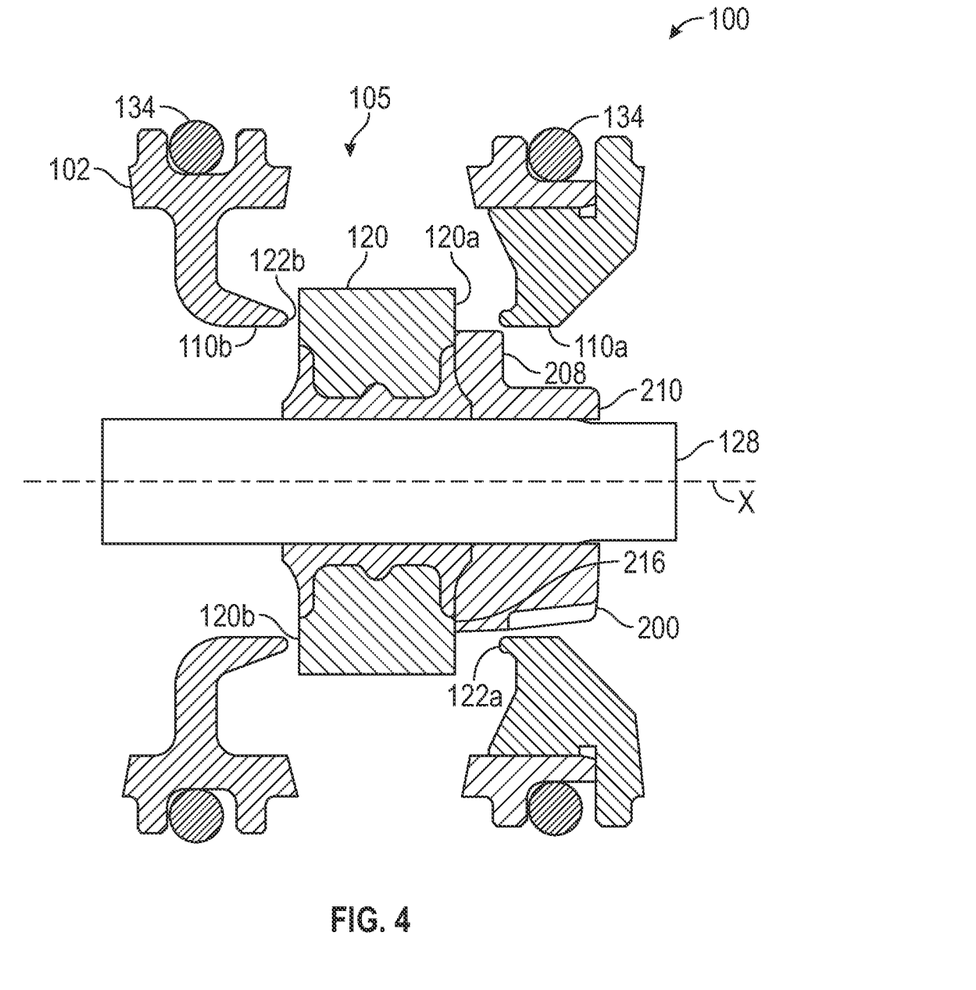
FIG. 4 is a detail view of a portion of the embodiment of FIGS. 2-3 in a transitional state.
Figure 5:
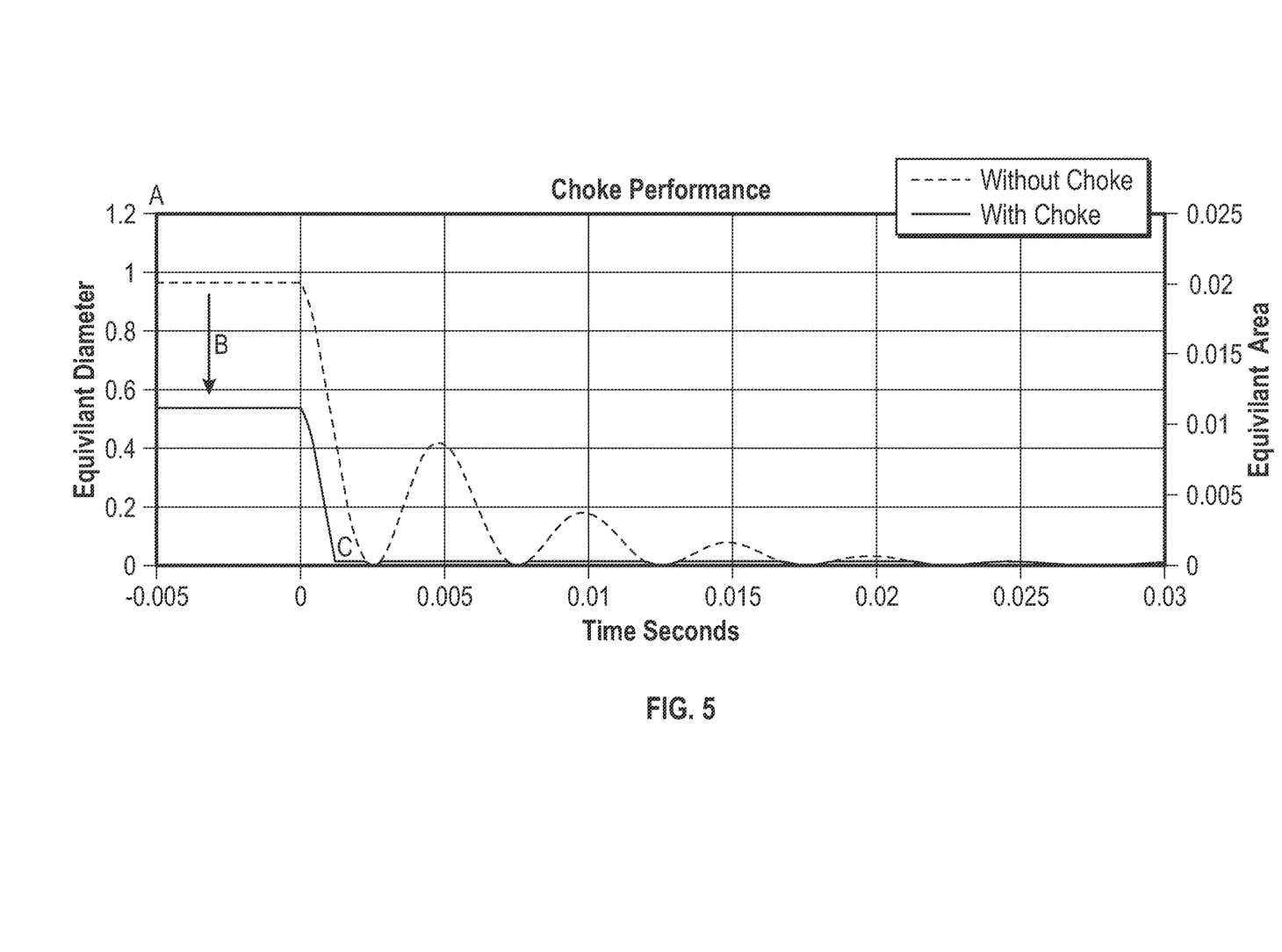
FIG. 5 is a choke performance graph illustrating the effective flow area of an exemplary solenoid valve during an energized to deenergized transition with and without a silencing choke according to the disclosure.

FIG. 1 is a perspective view of one of many embodiments of a silencing choke according to the disclosure. FIG. 2 is a schematic partial cross-sectional view of one of many embodiments of a solenoid valve in an energized state and having a silencing choke according to the disclosure. FIG. 3 is a schematic partial cross-sectional view of the embodiment of FIG. 2 in a de-energized state. FIG. 4 is a detail view of a portion of the embodiment of FIGS. 2-3 in a transitional state. FIG. 5 is a choke performance graph illustrating the effective flow area of an exemplary solenoid valve during an energized to deenergized transition with and without a silencing choke according to the disclosure. FIGS. 1-5 will be described in conjunction with one another.

In at least one embodiment, solenoid valve 100 (or "valve 100") can include a valve body 102, such as a casing, enclosure, bowl, frame or housing, for enclosing, protecting or otherwise supporting one or more other valve components. Valve 100 can include one or more ports, such as inlets or outlets, for fluid flow into and/or out of valve 100. For example, valve 100 can include one or more pressure ports 104, one or more common ports 105 and one or more exhaust ports 106. Valve body 102 can be or include a single, unitary body or can include a plurality of valve body portions coupled together. Valve body 102 can be formed in any shape or manner according to an implementation of the disclosure and valve 100 can include any number of bodies or body portions according to a particular implementation (e.g., mid-body 102a and lower body 102b, which can be referred to collectively as the "fluid end" of valve 100), any of which can be coupled with one another in any applicable fashion, which can, but need not, include the use of one or more couplers for coupling two or more valve components together, such as male couplers, female couplers, fasteners, receivers, adhesives or other coupling structure(s), whether separately or in combination.

Ports 104, 105, 106 can be configured to couple with and/or fluidically communicate with other structure in a valve system or fluid system, such as pipes, tubing, hoses, fluid sources, fluid receivers, fluid destinations, or other conduits or flow control components, which can include being configured to couple with a separate or separable coupler and/or comprising an integral coupler, in whole or in part. For example, as shown in the embodiment of FIGS. 2-4 for illustrative purposes, in at least one embodiment, which is but one of many, valve 100 can be or include a micro solenoid valve, such as an MSV-12 valve available from Aventics AG (Laatzen, Germany), and body 102 can be configured to threadingly or otherwise couple to a fluid head or other fluid system component (not shown) having one or more inlets and/or outlets for routing fluid into and/or out of one or more of ports 104, 105, 106 during valve operations. While a micro solenoid valve is depicted in the Figures for purposes of illustration and explanation, such a solenoid valve is but one of many types of valves to which the teachings and principles of the present disclosure can be applied.

Valve 100 can include one or more flow passages, such as a valve flow passage, fluid route or other flow path, for routing or otherwise directing fluid through the valve from one or more of ports 104, 105, 106 to another one or more of ports 104, 105, 106. For instance, valve 100 can have a flow passage 108a for routing fluid from common port 105 to exhaust port 106 (or vice versa) when valve 100 is in one or more positions (e.g., an energized position) as indicated by arrows F in FIG. 2 and a flow passage 108b for routing fluid from pressure port 104 to common port 105 (or vice versa) when valve 100 is in one or more positions (e.g., a deenergized position) as indicated by arrows F in FIG. 3. Each flow passage 108a, 108b can include, or at least can be described to include for ease of illustration and explanation, two or more sub-flow passages (or component flow passages) that collectively make up the corresponding flow passage through the valve. For example, in at least one embodiment, one or both of flow passages 108a, 108b can include one or more first passages, such as an inlet or other flow passage, from a point on an inlet side to a location along the passage (e.g., an orifice as further described below) and one or more second flow passages, such as an outlet or other flow passage, from such location to an outlet side of the flow passage. Valve 100 can include one or more other component flow passages as may be described in further detail elsewhere herein, separately or in combination with one another and/or any of first and second flow passages. Further, each component flow passage can, but need not, comprise a plurality of passages or other paths between two or more points along such flow passages.

Valve 100 can include one or more orifices, such as an opening, conduit or other passageway, for at least partially restricting or otherwise affecting flow through the valve. For instance, valve 100 can include an orifice 110a disposed at least partially within flow passage 108a, such as fluidically between common port 105 and exhaust port 106, and an orifice 110b disposed at least partially within flow passage 108b, such as fluidically between pressure port 104 and common port 105. Orifices 110a, 110b can include one or more seats 122a, 122b for cooperating with one or more valve members as further described below. Valve 100 can include an actuator assembly 116, such as a solenoid actuator assembly, for controlling fluid flow through at least a portion of valve 100, separately or in cooperation with one or more other valve components. Actuator assembly 116 can be adapted to couple to one or more other valve components, such as valve body 102 or a component coupled to valve body 102, directly or indirectly, in whole or in part. In at least one embodiment, actuator assembly 116 can include an actuator 118, such as a solenoid actuator, disposed at least partially within valve body 102 (or, e.g., a housing or other body coupled to valve body 102) for holding or otherwise supporting one or more components of actuator assembly 116 and/or other valve components. Actuator 118 can be adapted for moving and/or retaining or otherwise holding one or more valve members 120, such as a poppet, sealing disk or poppet assembly, to, from or in one or more positions. For instance, one or more valve members 120 can include or be coupled to an armature or plunger 128 and actuator 118 can be adapted for moving plunger 128 among one or more positions for controlling fluid flow through valve 100.

Plunger 128 and valve member 120 can have any number of positions according to an implementation of the disclosure. For example, valve member 120 can have one or more fully closed positions for maximizing resistance to flow through at least a portion of valve 100, which can include preventing flow there through. As another example, valve member 120 can have one or more fully open positions for minimizing resistance to flow through at least a portion of valve 100, such as by minimizing flow resistance caused by valve member 120 or a portion thereof. Valve member 120 can have one or more partially open (or partially closed) positions between the fully open and fully closed positions for allowing fluid flow at one or more rates between a maximum and a minimum flow rate, which can be or include any flow rate(s) according to an embodiment or implementation at hand.

In at least one embodiment, such as that shown in FIGS. 2-3 for illustrative purposes, valve member 120 can be configured to optionally sealingly couple with two or more orifices during valve operations. For instance, valve member 120 can have one side 120a for sealingly engaging seat 122a of orifice 110a (e.g., when valve 100 is in an energized position; see, e.g., FIG. 2) and another side 102b for sealingly engaging seat 122b of orifice 110b (e.g., when valve 100 is in a de-energized position; see, e.g., FIG. 3). Further, valve member 120 can have one or more interim or transition positions between such positions of engagement with orifices 110a, 110b, such as one or more longitudinal positions occupied during the transition of valve 100 from an energized state to a de-energized state or vice versa (see, e.g., FIG. 4).

As shown in the exemplary embodiment of FIGS. 2-3 for illustrative purposes, valve 100 can have an energized state wherein valve member 120 sealingly engages orifice 110a (e.g., for allowing fluid flow from common port 105 to exhaust port 106 and disallowing fluid flow between pressure port 104 and common port 105) and a de-energized state wherein valve member 120 sealingly engages orifice 110b (e.g., for disallowing fluid flow between common port 105 and exhaust port 106 and allowing fluid flow from pressure port 104 to common port 105). However, this need not be the case and, in at least one embodiment, valve 100 can alternatively or collectively be arranged for other flow configurations, which can include flow in one or more different directions and/or flow between or among two or more other ports, which can be or include any inlet and/or outlet ports according to an implementation of the disclosure. As another example, in at least one embodiment, one or more of ports 104, 105, 106 can be absent and valve 100 can be arranged for having a single pair of inlet and outlet ports with one or more orifices therebetween.

Actuator assembly 116 can be or include any type of solenoid actuator(s) and valve member(s) according to an implementation of the disclosure, whether now known or later developed. For example, in at least one embodiment, actuator 118 can include a solenoid coil (e.g., disposed within valve body 102) for generating a magnetic field and interacting with one or more other actuator components, such as plunger 128, to selectively move plunger 128 among one or more valve positions, such as linearly along central longitudinal axis X of valve 100. Valve member 120 can be coupled to plunger 128, which can be at least partially magnetic, and actuator 118 or a portion thereof (e.g. a coil) can move plunger 128 and valve member 120 back and forth relative to one or more seats 122a, 122b. Actuator assembly 116 can include one or more springs 130 for biasing plunger 128 in one or more directions or toward one or more positions, such as a default open or closed position in the absence of actuation force from actuator 118 sufficient to overcome a biasing force of spring(s) 130. Actuator assembly 116 can be coupled to one or more other portions or components of valve 100 in any manner(s) according to an implementation of the disclosure, such as threadingly, sealingly or otherwise, whether separately or in combination with one or more couplers (e.g., fasteners, retainers, adhesives, sealants, etc.).

Valve 100 and its components can be made from any material(s) required or desired according to an implementation of the disclosure, including, but not limited to, brass, lead-free brass, steel, stainless steel, plastic, copper, or other materials, separately or in combination, in whole or in part. Further, valve 100 can include one or more seals, such as for sealingly engagement among two or more components of valve 100 or, as another example, for sealing engagement of valve 100 with one or more other components in a valve system in which valve 100 may be incorporated, such as a fluid head or other device or structure (not shown) for routing fluid into and/or out of one or more of ports 104, 105, 106 (or any port(s) present in an embodiment of valve 100). For example, valve 100 can include one or more diaphragm seals 132 for fluidically sealing at least a portion of one or more flow passages 108a, 108b or other flow volumes of valve 100 and one or more O-rings 134 for sealing engagement with structure coupled to valve 100 (e.g., a fluid head or other conduit structure for directing fluid to and from valve 100). Seal(s) 132, 134 and/or one or more other seals of valve 100 can be or include any type of seal according to an implementation of the disclosure, including, but not limited to, ethylene propylene diene terpolymer (EPDM), fluoroelastomer/fluorocarbon (FKM), and hydrogenated nitrile butadiene rubber (HNBR) seals, among others, such as metal seals, separately or in combination, in whole or in part.

In at least one embodiment, valve 100 can include one or more chokes 200, such as a silencing choke, for at least partially minimizing or eliminating audible sound caused by armature bounce during valve operations, including but not limited to armature bounce occurring during an energized to deenergized transition of the valve. For example, in some solenoid valves, the armature or plunger (and hence the poppet or valve member) can bounce one or more times upon transition from one valve position to another, such as due to forces applied to or otherwise experienced by the armature and/or poppet via valve components (e.g., solenoid coils, springs), contact between valve components (e.g., valve members and seats) and/or fluid pressure fluctuations. Further, such bouncing can result in flow and/or pressure variations that occur at an audible frequency (e.g., from 20 Hz to 20,000 Hz) and resulting in a "popping" or similar noise that can be undesirable or unacceptable in at least some valve implementations. Choke 200 can be configured for at least partially minimizing or eliminating such behavior in one or more types of valves, including but not limited to a micro solenoid valve such as that shown in FIGS. 2-3 for illustrative purposes.

In at least one embodiment, choke 200 can be or include a choke body 202 configured to be disposed at least partially within a valve fluid path, such as, for example, flow passage 108b between common port 105 and exhaust port 106 of the exemplary valve illustrated in FIGS. 2-4 of the present disclosure. For example, choke 200 can be configured to couple to plunger 128 and can be disposed in a position along plunger 128 for alleviating audible sound that otherwise could result from bouncing of plunger 128 and valve member 120 during the transition or movement of plunger 128 from one position to another, such as from the energized position illustrated in FIG. 2 to the de-energized position illustrated in FIG. 3. As shown in the exemplary embodiment of FIG. 1, which is but one of many, choke 200 can include one or openings 204 therein or therethrough, such as a partial or thru hole or bore, and can be configured to be pressed or press fitted onto the exterior surface of plunger 128, which can but need not include plastic or elastic deformation of one or more press fit couplers 206. However, this need not be the case and alternatively (or collectively), choke 200 can be configured to couple with plunger 128 and/or valve member 120 (e.g., as part of a poppet or poppet assembly) in any manner according to an implementation of the disclosure, including but not limited to by way of one or more mechanical fasteners (e.g., set screws, pins), adhesives or other couplers or, as another example, by way of being formed integrally with all or a portion of plunger 128 and/or valve member 120, separately or in combination, in whole or in part.

In at least one embodiment, choke 200 can have a base 208 and a stem 210 for communicating or otherwise cooperating with one or more other valve components. At least a portion of base 208 can but need not have a major dimension, such as diameter d1, greater than a major dimension, such as diameter d2, of at least a portion of stem 210. In at least one embodiment, choke 200 can include one or more spokes 212, such as extensions, tongues or dividers, that extend radially outwardly from the exterior surface of stem 210 for guiding or routing fluid flow along at least a portion of choke 200. One or more spokes 210 can but need not be coupled to base 208 and/or extend the entire length of stem 210. One or more grooves 214, such as vents or other pathways, can be defined or otherwise disposed between adjacent spokes 210 for allowing fluid flow therein or therethrough during valve operations, as further discussed below. Choke 200 can be made from any material(s) according to an implementation of the disclosure (e.g., plastic, rubber, metal, etc.), separately or in combination, in whole or in part. Similarly, choke 200 can have any dimensions according to an implementation of the disclosure, including but not limited to lengths, heights, widths, thicknesses, internal dimensions and external dimensions. Further, such dimensions can be constant or can change in one or more directions (e.g., choke 200 can be wholly or partially tapered from one end to another), as needed or desired according to an implementation of the disclosure. Also, while the exemplary embodiment of FIG. 1 is shown to be circular or round, this need not be the case and choke 200 can alternatively (or collectively) have or include any cross-sectional shape(s) according to an implementation of the disclosure (e.g., square, rectangular, elliptical, oblong, irregular, etc.), separately or in combination, in whole or in part.

Choke 200 or a portion thereof, such as base 208 or its bottom or end surface 216, can but need not be configured to contact and/or couple with valve member 120 or a portion thereof. Further, in at least one embodiment, stem 210 can advantageously be configured for supporting proper alignment or positioning of base 208 relative to a valve orifice (e.g., orifice 110a) during valve operations. As further discussed below, base 208 can pass into and out of orifice 110a as plunger 128 moves back and forth during energization and deenergization of valve 100. In at least one embodiment, stem 210 or a portion thereof can be of a sufficient length (i.e., along axis X) such that at least a portion of choke 200 remains disposed through orifice 110a (i.e., disposed within exhaust port 106) throughout the entire stroke of valve 100 or plunger 128. In this manner, stem 108 can be configured to at least partially reduce or eliminate any potential for base 208 to come into unwanted contact with orifice 110a and/or other surrounding valve structure, which could result in malfunction of or damage to the valve.

Choke 200 can be advantageously shaped, sized and positioned for affecting fluid flow through at least a portion of valve 100 in one or more ways, which can include being configured for reducing the effective flow area of one or more orifices (e.g., orifice 110a in the exemplary configuration of FIGS. 2-4) at one or more times during valve operations. For example, in at least one embodiment, choke 200 can be disposed on side 120a of valve member 120 for affecting fluid flow through orifice 120a when valve 100 is in an energized position as shown in FIG. 2 and/or while valve 100 is transitioning (see, e.g., FIG. 4) from the energized position to the de-energized position as shown in FIG. 3 while nonetheless leaving fluid flow through one or more other orifices (if present), such as orifice 120b, unaffected by choke 200. More specifically, as will be appreciated by a person of ordinary skill in the art having the benefits of the present disclosure, in at least some solenoid valves, stroke limited flow can occur as plunger 128 approaches and/or bounces relative to orifice 110a during valve transition, which can result in relatively high frequency flow fluctuations (e.g., 200 Hz or about 200 Hz) that can cause undesired or unacceptable audible sounds during valve operations. More specifically, as will be appreciated by a person of ordinary skill in the art having the benefits of the present disclosure, at least some solenoid valves can exhibit positions of "stroke limited" flow wherein the valve member or poppet is not far enough from its corresponding orifice to achieve the maximum flow allowed by the orifice and positions of "orifice limited" flow wherein the stroke of the valve is sufficient enough such that the orifice itself constitutes the point of greatest restriction along the relevant flow path. In an orifice limited condition, variations in stroke will not affect flow (in at least some valves) whereas in a stroke limited condition variations in stroke will result in variations in flow. Choke 200 or a portion thereof, such as base 208, can be advantageously shaped, sized and positioned relative to orifice 110a for filling in or reducing the effective area of orifice 110a as valve member 120 transitions from the point of orifice limited flow to its resting state in sealing engagement with orifice 110a (e.g., when valve 100 reaches its fully de-energized resting state). In this manner, choke 200 can limit the maximum flow through orifice 110a while the system comes to rest, which can result in a state of orifice limited flow during such a transitional state and which can thus minimize or eliminate the flow variation and noise that would otherwise be present due to stroke limited flow variations. In other words, while bouncing may still occur with choke 200 present, choke 200 nonetheless limits maximum flow through the orifice for minimizing or eliminating the flow variations that occur due to movement of the valve member back and forth relative to the orifice during bouncing.

In addition to the advantages described above, in at least one embodiment, choke 200 can be configured for providing one or more other advantages in the operation of valve 100. For example, choke 200 or a portion thereof, such as base 208, can at least partially resist or reduce unwanted cross flow among two or more ports or valve flow passages during a transitional state, such as from pressure port 104 or flow passage 108b to exhaust port 106 or flow passage 108a as valve 100 transitions from an energized state to a de-energized state (or otherwise). In other words, by reducing the effective flow area of orifice 110a during a transitional state wherein at least some fluid communication may take place between flow passage 108a and flow passage 108b, choke 200 can reduce or limit the ability of fluid from flow passage 108b to make its way through orifice 110a and into exhaust port 106. As another example, choke 200 can be configured to choke or limit flow rate through one or more flow passages of valve 100. For instance, in an embodiment of valve 100 wherein the maximum available flow rate from one port to another (e.g., from common port 105 to exhaust port 106 or vice versa) is greater than a flow rate desired or required for an implementation of valve 100 at hand, choke 200 can be sized and positioned for limiting or reducing the effective flow area of an orifice (e.g., orifice 110a), including when a valve member is in a fully open position relative to such orifice. Further, in an embodiment of choke 200 having a stem 210 with one or more spokes 212 and grooves 214, the size and/or number of grooves 214 can be configured as needed or desired for increasing or decreasing the effective flow area of an orifice when stem 210 is disposed in one or more positions relative to the orifice. In other words, the flow area of one or more grooves 214 can be increased at one or more points along stem 210 for increasing available flow area and vice versa.

With continuing reference to the Figures and specific reference to FIG. 5, one or more of the above-mentioned features and advantages of a valve 100 having a choke 200 according to the disclosure can be further illustrated and appreciated upon graphically comparing the performance of an exemplary valve (which is but one example of many) during an energized to de-energized transition with and without one of many embodiments of choke 200 present. More specifically, FIG. 5 shows the change in effective flow diameter and effective flow area over time for an exemplary MSV-12 valve as the valve member or poppet transitions from a fully open to a fully closed (rest) position relative to its corresponding orifice. As indicated by the arrow and the flow dimension values from point A to point B, the exemplary implementation of choke 200 was configured to reduce the effective flow dimension of the orifice by approximately 50% or more in the fully open position. Further, choke 200 enabled the valve to reach the point of orifice limited flow C faster and virtually eliminated the change in flow dimension caused by armature bounce by way of maintaining a constant maximum flow dimension between choke 200 and the orifice as the armature bounce (reflected by the fluctuations of the broken line) dissipated and the armature ultimately came to rest, thereby also eliminating the popping noise exhibited by the valve in the absence of choke 200.

The systems and methods disclosed herein are not limited to the exemplary valve type shown in the Figures for illustrative purposes and can be applicable or applied to many different types and styles of valves, valve components and valve systems. Further, while the teachings of the disclosure can be particularly advantageous for solenoid valves, they are not necessarily limited thereto and valve 100 can be or include any type of valve, whether now known or later developed, such as, for example, linear, rotary, solenoid, pilot, diaphragm, mechanical, electromechanical, hydraulic, pneumatic and other types of valves for manipulating the passage of one or more fluids across a distance or point, separately or in combination, in whole or in part. The term "fluid(s)" as used herein includes any substance or material capable of flowing, such as, for example, liquid(s), gas(es) and combinations thereof (regardless of whether one or more solids or other non-fluids may be present therein).

In at least one embodiment, a silencing choke for a solenoid valve can include a base and a stem configured to be coupled to an armature and can be configured for at least partially reducing or eliminating noise caused by armature bounce. A choke can be configured for limiting maximum flow through an orifice during at least a portion of a valve transition, which can include creating a state of orifice limited flow during the occurrence of armature bounce. A choke can be configured for at least partially reducing cross flow among ports and for limiting a maximum flow rate through at least one flow path of a valve.

In at least one embodiment, a solenoid valve can include a pressure port, a common port, an exhaust port and an armature with a poppet having a first side for selectively engaging a first orifice fluidically between the pressure port and the common port and a second side for selectively engaging a second orifice fluidically between the common port and the exhaust port, and a silencing choke. The silencing choke can include a base having a first side and a longitudinally opposite second side, a stem coupled to the second side of the base, and an opening through the base and the stem. The silencing choke can be configured to be coupled to the armature with the armature disposed through the opening and the first side of the base facing the second side of the poppet.

In at least one embodiment, the solenoid valve can have an energized state wherein the poppet sealingly engages the first orifice, a deenergized state wherein the poppet sealingly engages the second orifice and a transitional state wherein the valve is transitioning from the energized state to the deenergized state. The silencing choke can be configured so that at least a portion of the silencing choke is disposed through the second orifice when the solenoid valve is in at least one of the energized state, the deenergized state and the transitional state. The silencing choke can be configured so that at least a portion of the silencing choke is disposed through the second orifice when the solenoid valve is in each of the energized state, the deenergized state and the transitional state. The silencing choke can be configured so that the base is disposed within the common port when the solenoid valve is in the energized state.

In at least one embodiment, the silencing choke can be configured to limit maximum flow through the second orifice during at least a portion of the transitional state. The silencing choke can be configured to limit maximum flow through the second orifice during the portion of the transitional state wherein armature stroke variations result in flow variations. The silencing choke can be configured to at least partially reduce noise caused by bouncing of the armature and/or poppet during deenergization of the solenoid valve.

In at least one embodiment, the base of the choke can have a major dimension that is less than a major dimension of the second orifice. In at least one embodiment, the stem of the choke can have a major dimension that is less than the major dimension of the base. In at least one embodiment, the stem of the choke can include one or more spokes configured to bias the base toward a central position relative to the second orifice for preventing the base from contacting a seat of the second orifice. In at least one embodiment, the stem of the choke can include a plurality of spokes that extend radially outwardly from an exterior surface of the stem and the plurality of spokes and the exterior surface of the stem can define at least one vent pathway for routing fluid from the common port to the exhaust port when the solenoid valve is in an energized state. In at least one embodiment, the silencing choke can be configured to be coupled to the armature by interference fit.

Other and further embodiments utilizing one or more aspects of the systems and methods described above can be devised without departing from the spirit of Applicants' disclosure. For example, the devices, systems and methods disclosed herein can be used alone or to form one or more parts of other valves, valve components and/or fluid control systems, as well as of flow control components other than valves. Further, the various methods and embodiments of the valves and chokes can be included in combination with each other to produce variations of the disclosed methods and embodiments. Discussion of singular elements can include plural elements and vice-versa. References to at least one item followed by a reference to the item can include one or more items. Also, various aspects of the embodiments can be used in conjunction with each other to accomplish the understood goals of the disclosure.

Unless the context requires otherwise, the words "comprise," "include," and "has" (including variations and conjugations thereof, such as "comprises," "including," "have" and so forth) should be understood to imply the inclusion of at least the stated element or step or group of elements or steps or equivalents thereof, and not the exclusion of a greater numerical quantity or any other element or step or group of elements or steps or equivalents thereof. The devices, apparatuses and systems can be used in a number of directions and orientations. The order of steps can occur in a variety of sequences unless otherwise specifically limited. The various steps described herein can be combined with other steps, interlineated with the stated steps, and/or split into multiple steps. Similarly, elements have been described functionally and can be embodied as separate components and/or can be combined into components having multiple functions.

The embodiments have been described in the context of preferred and other embodiments and not every embodiment of Applicants' disclosure has been described. Obvious modifications and alterations to the described embodiments are available to those of ordinary skill in the art having the benefits of the present disclosure. The disclosed and undisclosed embodiments are not intended to limit or restrict the scope or applicability of Applicants' disclosures, but rather, in conformity with the patent laws, Applicants intend to fully protect all such modifications and improvements that come within the scope or range of equivalents of the claims.

What is claimed is:

1. A silencing choke for a solenoid valve having a pressure port, a common port, an exhaust port and an armature with a poppet having a first side for selectively engaging a first orifice fluidically between the pressure port and the common port and a second side for selectively engaging a second orifice fluidically between the common port and the exhaust port, the silencing choke comprising:
   a base having a first side and a longitudinally opposite second side;
   a stem coupled to the second side of the base; and
   an opening through the base and the stem;
   wherein the silencing choke is configured to be coupled to the armature with the armature disposed through the opening and the first side of the base facing the second side of the poppet.

2. The silencing choke of claim 1, wherein the solenoid valve has an energized state wherein the poppet sealingly engages the first orifice, a deenergized state wherein the poppet sealingly engages the second orifice and a transitional state wherein the valve is transitioning from the energized state to the deenergized state, and wherein the silencing choke is configured so that at least a portion of the silencing choke is disposed through the second orifice when the solenoid valve is in at least one of the energized state, the deenergized state and the transitional state.

3. The silencing choke of claim 2, wherein the silencing choke is configured so that at least a portion of the silencing choke is disposed through the second orifice when the solenoid valve is in each of the energized state, the deenergized state and the transitional state.

4. The silencing choke of claim 2, wherein the silencing choke is configured so that the base is disposed within the common port when the solenoid valve is in the energized state.

5. The silencing choke of claim 2, wherein the silencing choke is configured to limit maximum flow through the second orifice during at least a portion of the transitional state.

6. The silencing choke of claim 5, wherein the silencing choke is configured to limit maximum flow through the second orifice during the portion of the transitional state wherein armature stroke variations result in flow variations.

7. The silencing choke of claim 1, wherein the silencing choke is configured to at least partially reduce noise caused by bouncing of the armature and/or poppet during deenergization of the solenoid valve.

8. The silencing choke of claim 1, wherein the base has a major dimension that is less than a major dimension of the second orifice.

9. The silencing choke of claim 8, wherein the stem has a major dimension that is less than the major dimension of the base.

10. The silencing choke of claim 1, wherein the stem comprises one or more spokes configured to bias the base toward a central position relative to the second orifice for preventing the base from contacting a seat of the second orifice.

11. The silencing choke of claim 1, further comprising a plurality of spokes that extend radially outwardly from an exterior surface of the stem and wherein the plurality of spokes and the exterior surface of the stem define at least one vent pathway for routing fluid from the common port to the exhaust port when the solenoid valve is in an energized state.

12. The silencing choke of claim 1, wherein the silencing choke is configured to be coupled to the armature by interference fit.

13. A solenoid valve, comprising:
a pressure port;
a common port;
an exhaust port;
an armature with a poppet having a first side for selectively engaging a first orifice fluidically between the pressure port and the common port and a second side for selectively engaging a second orifice fluidically between the common port and the exhaust port; and
a silencing choke coupled to the armature, the silencing choke comprising
a base having a first side and a longitudinally opposite second side;
a stem coupled to the second side of the base; and
an opening through the base and the stem;
wherein the armature is disposed through the opening of the silencing choke; and
wherein the silencing choke is disposed with the first side of the base facing the second side of the poppet.

14. The solenoid valve of claim 13, wherein the solenoid valve has an energized state wherein the poppet sealingly engages the first orifice, a deenergized state wherein the poppet sealingly engages the second orifice and a transitional state wherein the valve is transitioning from the energized state to the deenergized state, and wherein the silencing choke is configured so that at least a portion of the silencing choke is disposed through the second orifice when the solenoid valve is in at least one of the energized state, the deenergized state and the transitional state.

15. The solenoid valve of claim 14, wherein at least a portion of the silencing choke is disposed through the second orifice when the solenoid valve is in each of the energized state, the deenergized state and the transitional state.

16. The solenoid valve of claim 14, wherein the base of the silencing choke is disposed within the common port when the solenoid valve is in the energized state.

17. The solenoid valve of claim 14, wherein the silencing choke is configured to limit maximum flow through the second orifice during at least a portion of the transitional state.

18. The solenoid valve of claim 17, wherein the silencing choke is configured to limit maximum flow through the second orifice during the portion of the transitional state wherein armature stroke variations result in flow variations.

19. The solenoid valve of claim 13, wherein the silencing choke is configured to at least partially reduce noise caused by bouncing of the armature and/or poppet during deenergization of the solenoid valve.

20. The solenoid valve of claim 13, wherein the stem of the silencing choke comprises one or more spokes configured to bias the base toward a central position relative to the second orifice for preventing the base of the silencing choke from contacting a seat of the second orifice.

* * * * *